United States Patent [19]
Schlenker

[11] 3,886,037
[45] May 27, 1975

[54] NUCLEAR FUEL PIN CONTROLLED FAILURE DEVICE

[75] Inventor: Larry D. Schlenker, Idaho Falls, Idaho

[73] Assignee: The United States Energy Research and Development Administration, Washington, D.C.

[22] Filed: Aug. 17, 1973

[21] Appl. No.: 389,287

[52] U.S. Cl. .................... 176/68; 176/80; 176/78
[51] Int. Cl. ............................................. G21c 3/06
[58] Field of Search .................... 176/68, 76, 78, 80

[56] References Cited
UNITED STATES PATENTS
3,719,560  3/1973  Mayers et al. .................... 176/78
FOREIGN PATENTS OR APPLICATIONS
913,920  12/1962  United Kingdom .................. 176/80

Primary Examiner—Verlin R. Pendegrass
Attorney, Agent, or Firm—John A. Horan; Arthur A. Churm; Frank H. Jackson

[57] ABSTRACT

Each fuel pin of a fuel assembly for a water-cooled nuclear reactor is provided with means for rupturing the cladding tube thereof at a predetermined location if an abnormal increase in pressure of the gases present therein occurs due to a loss-of-coolant accident. Preferably all such rupture means are oriented to minimize the hydraulic resistance to the flow of emergency core coolant such as all rupture means pointing in the same direction. Rupture means may be disposed at different elevations in adjacent fuel pins and, further, fuel pins may be provided with two or more rupture means, one of which is in the upper portion of the fuel pin. Rupture means are mechanical as by providing a locally weakened condition of a controlled nature in the cladding.

8 Claims, 4 Drawing Figures

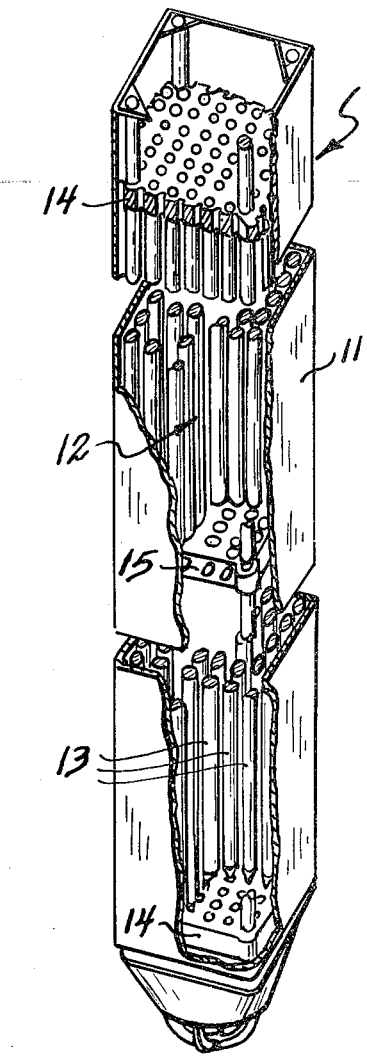
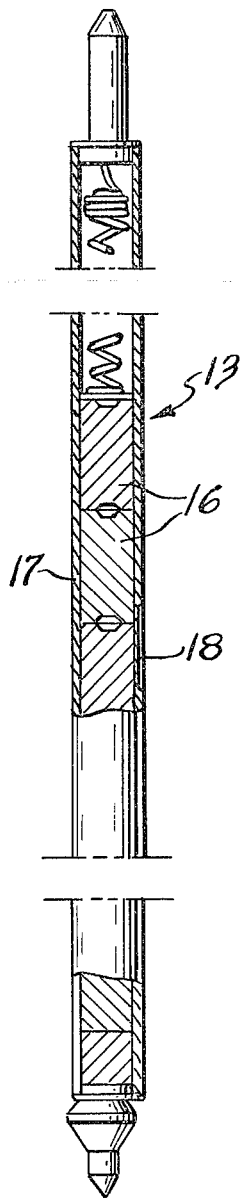
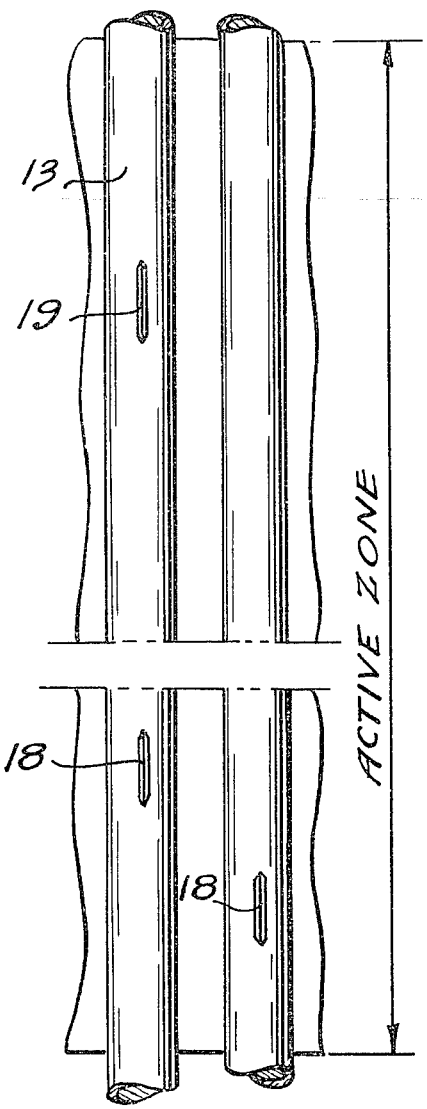
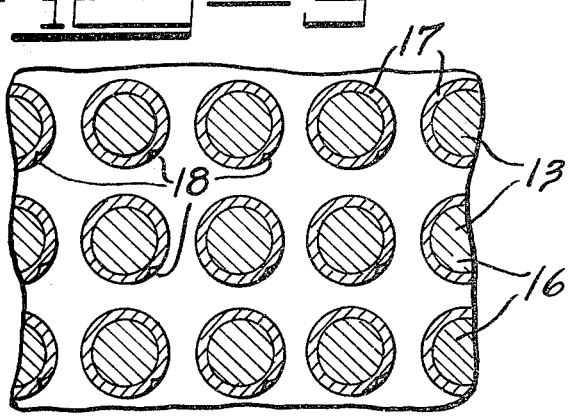

NUCLEAR FUEL PIN CONTROLLED FAILURE DEVICE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to reactor safety. In more detail the invention relates to the prevention of fuel pin swelling in a water-cooled nuclear reactor upon occurrence of an accident. In still more detail the invention relates to a fuel assembly for a water-cooled nuclear reactor wherein the possibility that propagation of fuel pin failures within the fuel assembly can occur after a loss-of-coolant accident is minimized.

If a nuclear reactor suffers a loss-of-collant accident, the subsequent thermodynamic events occurring in the reactor include a redistribution of the stored heat in the fuel pins of the reactor and the generation of additional heat due to residual nuclear fission processes and nuclear decay of the fission products. Because a loss-of-collant accident also results in a reduction of the rate of heat transfer from the fuel pins to the coolant surrounding them, the temperature of the fuel pins may rise above the normal operational design value, particularly in the region of the fuel cladding. As a consequence of these events, there is a decrease in the mechanical strength of the metal cladding which encases the nuclear fuel and also an increase in pressure of the gaseous material confined within the fuel pins.

Due to the weakened condition of the fuel pin cladding and the increased internal pressure, the cladding swells enlarging the diametrical dimensions of the fuel pin. The swollen conditions may occur over an axial length interval of less than 1 inch up to as much as several feet. If the accident condition progresses far enough, the fuel pin cladding will no longer be able to restrain the internal pressure and the cladding will perforate allowing gaseous and particulate matter to pass from the interior regions of the fuel pins to move above in the nuclear reactor pressure vessel.

Concurrent with the swelling of the fuel pins, the cross sectional area of the coolant flow channel which surrounds the fuel pins is reduced. This reduction of the coolant flow channel area increases the hydraulic resistance to the flow of emergency core coolant and thereby reduces the effectiveness of the emergency core coolant accident-limiting safety system. As a consequence, the nuclear reactor core may continue to heat up and cause melting of the core materials. This could result in a breach of the safety system containment and release large amounts of radioactive material outside the confines of the containment structure.

SUMMARY OF THE INVENTION

According to the present invention the fuel pins of a nuclear reactor are modified to incorporate means for rupturing the cladding thereof at a predetermined location if a loss-of-coolant accident should occur. The operational characteristics of the device used therefor are such that the performance of a fuel pin would not be perturbed in any important way during normal reactor service but the device causes the fuel pin cladding to perforate at lower pressure during a loss-of-coolant accident at a predetermined location and with less geometrical cladding distortion than would occur in an unmodified fuel pin in a similar environment. The controlled rupture means would be a designed mechanical weakness in the cladding such as partial penetration of the fuel pin cladding with slots, holes, dimples or other forms of controlled geometric disfiguration.

BRIEF DESCRIPTION OF THE DRAWING

The invention will next be described in connection with the accompanying drawing wherein:

FIG. 1 is a sketch in perspective of a fuel assembly for a water-cooled nuclear reactor;

FIG. 2 is a fuel pin therefor;

FIG. 3 is a partial horizontal cross section through the fuel assembly; and

FIG. 4 is a sketch illustrating various possible locations for the controlled rupture device of the present invention.

DESCRIPTION OF A PREFERRED EMBODIMENT

As shown in the drawing fuel assembly 10 comprises a shroud 11 enclosing a bundle 12 of spaced, slender, elongated, parallel fuel pins 13 which are held in square array within the shroud 11 by end fittings 14 and spacers 15.

Fuel pins 13 contain a column of pressed and sintered fuel pellets 16 disposed within cladding tubes 17.

Fuel assemblies of this type are used conventionally in both pressurized-water reactors and boiling-water reactors. A subassembly for a boiling-water reactor used in a central station power plant may typically employ slightly enriched $UO_2$ as fuel, zirconium alloy as cladding material and may contain 49 fuel pins arranged in a 7 × 7 bundle with individual fuel pins being spaced 0.738 inches apart center to center. The full length of the cladding tubes is then 160 inches and the length of the column of fuel pellets 16 (the active length) is 12 feet with each fuel rod being 0.58 inches in diameter and the cladding thicknesses being .035 inches. A subassembly in a pressurized-water reactor may also typically employ slightly enriched $UO_2$, as fuel, zirconium alloy as cladding material and may contain 204 fuel pins and 21 control rods arranged in a 15 × 15 square bundle. Individual fuel pins are spaced 0.563 inches apart with the fuel rod diameter being 0.422 inch and cladding thickness being .025 inch.

Application of the present invention to the fuel assemblies heretofore described will next be described. According to the present invention as specifically shown in the drawing each fuel pin 13 contains in the cladding thereof at at least one predetermined location a rupture slot 18 wherein the cladding is locally thinned. These rupture slots are provided to ensure that the cladding 17 of affected fuel pins 13 will rupture at particular locations at which minimum adverse effects upon the subsequent flow of emergency core coolant will be noted in the reactor should a loss-of-coolant accident occur. This rupture at preplanned locations will occur rather than uncontrolled swelling of the fuel pins which would cause a more serious reduction of the cross-sectional area of the coolant flow channels in the fuel pin array and might cause propagation of fuel pin failures across the fuel assembly.

To further reduce the hydraulic resistance to flow of coolant and thereby further enhance the efficiency of an emergency core coolant system and the safety of the power plant in general, rupture slots 18 are provided on all fuel pins within a single fuel assembly pointing in the same azimuthal direction as shown in FIG. 3. Advantageous results are also attained by arranging the rupture slots 18 at different elevations on adjacent fuel pins as shown in FIG. 4. This should be done systematically to assure low hydraulic flow resistance. An additional feature is to locate more than one rupture slot on each fuel pin with one of the rupture slots 19 being located in the top four feet of the active length of the fuel column also as shown in FIG. 4 to accommodate the loss-of-coolant accident situation of partial core inundation and partial core dryout.

Rupture of the cladding at a preplanned location is obtained by mechanical means as by the slots shown or by other forms of geometrical disfiguration of the cladding such as disks, holes or dimples wherein the cladding is partially penetrated from either the interior or the exterior to locally thin the cladding.

The thickness of the cladding within the rupture slot or disk will vary with the degree of prepressurization of the fuel pin and an experimental effort will be required to optimize this parameter for each reactor design. For .025 inch cladding the depth of penetration of the cladding in slots 18 may be about .010 inch and for .035 inch cladding it may be about .014 inch.

The specific operational philosophy of these mechanical failure designs is that the higher fuel pin surface temperatures and/or general internal pressure which accompany a loss-of-coolant accident are sufficient to cause the fuel pin cladding to preferentially perforate at the location of the point of weakness before significant gross fuel pin swelling occurs. Consequently, provision of a rupture means at a predetermined location on the fuel pins will minimize the obstruction in the coolant flow channels at the perforation location and at other axial locations along the fuel pins.

The major advantage of providing a rupturable area in the cladding relative to the existing manufacturing technique of using uniform fuel pin cladding is that the adverse geometrical distortion of fuel pin swelling can be generally reduced and confined to preselected locations, thereby enhancing the probability of successful operation of emergency core cooling safety systems following a loss-of-coolant accident.

The proposed rupture device would operate on the principle of passive control. That is, the cause of the rupture device to initiate and establish a perforation of the fuel rod cladding is solely related to a predesigned sensitivity to the atypical conditions which exist in the nuclear reactor core environment during a loss-of-coolant accident and specifically does not require any externally initiating or directive influence.

The embodiments of the invention in which an exclusive property or privilege is claimed are defined as follows:

1. A fuel assembly for a water-cooled nuclear reactor including a plurality of parallel, slender elongated fuel pins held together in square array to form a fuel bundle, said fuel pins containing nuclear fuel hermetically sealed with a cladding tube and including means associated with said cladding tubes for rupturing the cladding tubes at a predetermined location said means for rupturing the cladding tubes being all oriented in the same azimuthal direction within the fuel bundle whereby hydraulic resistance to the flow of emergency core coolant will be minimized in the event a loss-of-coolant accident causes rupture of the cladding tubes due to build-up of pressure of fission products within the fuel pins.

2. Fuel assembly according to claim 1 wherein the means for rupturing the cladding tubes are rupture slots in said cladding tubes.

3. Fuel assembly according to claim 2 wherein said rupture means are constituted of cladding material which is mechanically weaker at the point rupture is desired than the remainder of the cladding material.

4. Fuel assembly according to claim 3 wherein the cladding tube is thinner at the point rupture is desired than in the remainder of the cladding tube.

5. Fuel assembly according to claim 4 wherein the rupture means on adjacent fuel pins are disposed at different elevations.

6. Fuel assembly according to claim 5 wherein at least some of the fuel pins include two rupture means, one of which is located in the upper portion of the fuel pin.

7. Fuel assembly according to claim 5 wherein the nuclear fuel is slightly enriched uranium dioxide, the cladding tube is made of zirconium alloy, the cladding tube is normally 0.025 to 0.035 inches thick and the cladding has been locally thinned at the point rupture is desired.

8. Fuel assembly according to claim 1 wherein the active length of the nuclear fuel is 12 feet and each fuel pin includes two rupture means, one of which is in the upper four feet of the active length of the nuclear fuel.

* * * * *